Figure 1:
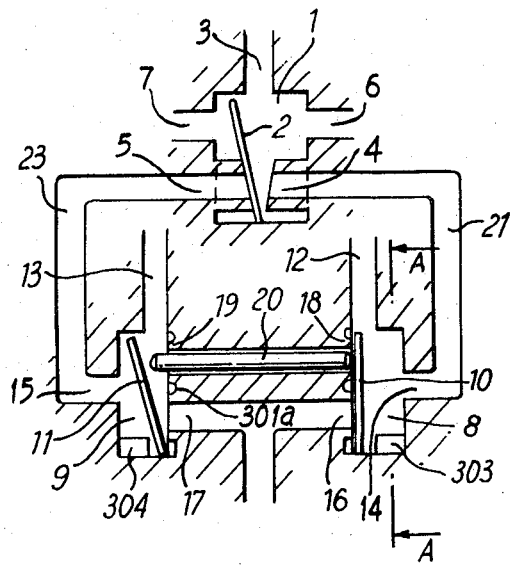

United States Patent [19]
Zadow et al.

[11] 3,851,664
[45] Dec. 3, 1974

[54] VALVES

[76] Inventors: Hanni Zadow; Herbert Rudolph Julius Zadow, both of 17 Rosedale Rd., Heaton Chapel, Stockport, Chesire, England

[22] Filed: Nov. 10, 1972

[21] Appl. No.: 305,617

[30] Foreign Application Priority Data
Nov. 13, 1971 Great Britain.................... 52797/71

[52] U.S. Cl.......................... 137/596.15, 137/625.5
[51] Int. Cl............................................. F16k 31/12
[58] Field of Search......... 137/596.14, 625.6, 625.5, 137/596.15, 625.63, 608, 610, 612; 251/25, 26, 28, 29, 32

[56] References Cited
UNITED STATES PATENTS

| | | | |
|---|---|---|---|
| 2,255,292 | 9/1941 | Lincoln............................ | 137/610 X |
| 3,385,309 | 5/1968 | Bains ............................... | 137/612 X |
| 3,709,244 | 11/1970 | Zadow et al..................... | 137/625.5 |

Primary Examiner—Martin P. Schwadron
Assistant Examiner—Robert J. Miller
Attorney, Agent, or Firm—Breitenfeld & Levine

[57] ABSTRACT

A valve assembly comprising at least two valves each having a chamber provided with inlet and outlet ports. Each chamber accommodates a movable plate-like valve member to control flow through the ports. Control means, which may be in the form of a movable rod engageable with the valve member, controls the position of the valve member.

20 Claims, 17 Drawing Figures

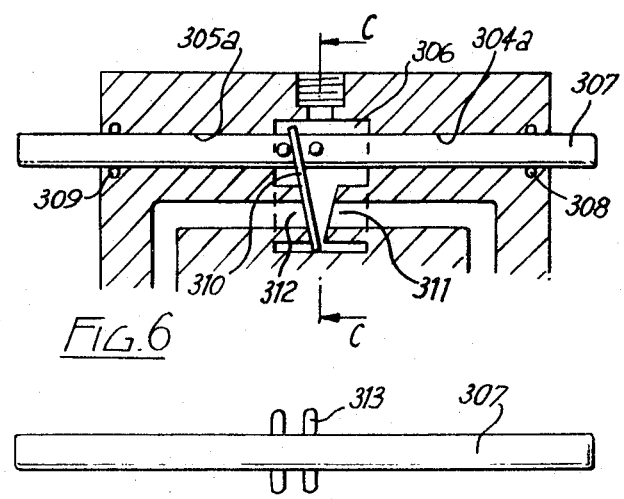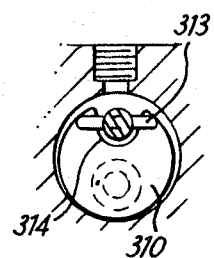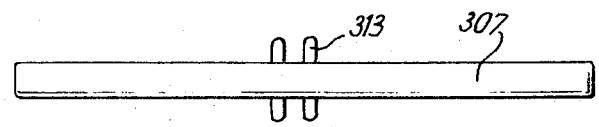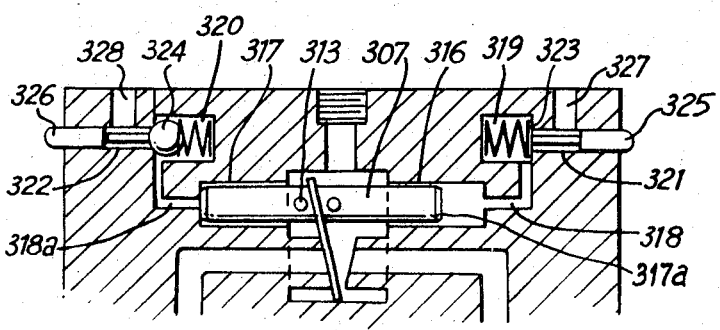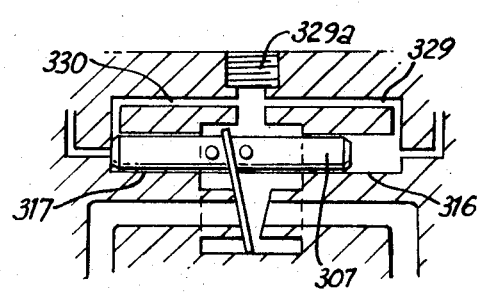

VALVES

This invention relates to fluid flow control valves and valve assemblies and is an improvement in or modification of the valves and valve assemblies disclosed in Co-pending application Ser. No. 86659 filed Nov. 4, 1970, now U.S. Pat. No. 3,709,244 to which reference may be made for further details and which is incorporated herein by reference.

According to one aspect of the invention a fluid flow control valve comprises a housing a chamber in the housing, an inlet port in communication with the housing, at least one outlet port from the chamber, a plate-like valve member movable in the chamber in response to control means selectively to prevent flow through the outlet ports, a second fluid flow control valve having a housing, a chamber in the housing, an outlet port, an entry port in communication with one said outlet port, a further port in communication with the second valve chamber, a plate-like valve member movable in the second valve chamber alternatively to prevent communication between the further port and the outlet port whilst allowing communication between the further port and the entry port or to obstruct communication between the further port and the entry port and allow communication between the further port and the outlet port, in which said control means comprises an operating member engageable with the plate-like valve member of the first valve to move the plate positively in two opposed directions.

The ends of the plunger may extent exteriorly of the housing.

The ends of the plunger may be reciprocable in bores leading from opposed walls of said chamber, passages communicating respectively with the bores and containing normally closed valve ports means for providing communication between the inlet ports and said passages and operating means operatively connected with further valve members associated with the normally closed valve ports for opening same, the plunger blocking communication between the inlet port and the respective passage at the limits of movement of the plate. The valves members may be biassed to the normally closed position and there may be drain passages communicating with said valve ports via passages containing the operating means, which may be rods or the like extending exteriorly of the housing, or the passage may lead direct to the circuit.

There may be passages leading from the inlet port to the ends of the bores which are engaged by the ends of the plunger at the limits of movement of the plate.

The operating means may comprise a member one end of which extends into a chamber so as to be engageable by a plate movable in the chamber in response to a signal; and means may be provided to increase the mechanical advantage of said plate on the operating member. Alternatively the operating member may be engageable by a diaphragm in a chamber arranged for receiving a control signal. Said chamber may communicate with an associated drain.

There may be two plates in the valve chamber, and spring means biassing the plates apart, said plunger having means for alternately engaging the plates to effect the alternate opening and closing of two outlet ports from the chamber.

According to another aspect of the invention a fluid flow control valve assembly comprises a first fluid flow control valve having a housing, a chamber in the housing, an inlet port leading into the chamber, at least one outlet port leading from the chamber, a valve member in the form of at least one plate in the chamber movable in response to control means to obstruct selectively the outlet port, a second fluid flow control valve having a housing and a chamber in the housing and a valve member in the form of a plate movable in the chamber, an entry port in a wall of said second chamber and communicating with an outlet port of the first valve, an exit port in an opposed wall of the second chamber and a further port communicating with the second chamber a recess in communication with opposite side of the plate to reduce the area of said opposed wall engageable by a face of the valve member the valve member being movable to alternatively prevent communication between the further port and the exit port whilst allowing communication between the entry port and the further port or obstruct communication between the further port and the entry port whilst allowing communication between the further port and the exit port.

One arrangement includes a third fluid flow control valve having a housing, a chamber in the housing, another port communicating with the third chamber an entry port in a wall of the chamber in communication with an outlet port of the first valve, an exit port in an opposed wall, a valve member in the form of a plate movable in the chamber alternatively to prevent communication between the another port and the exit port whilst allowing communication between the another port and the exit port or obstructing communication between the another port and the entry port whilst allowing communication between the another port and the exit port, a recess in said opposed wall in communication with the opposite side of the plate to reduce the area of said opposed wall engageable by a face of the valve member, a plunger movable in a bore between the second and third chambers to protrude alternatively into one of the chambers to actuate the respective valve member.

The exit port may have a common entrance in the opposed wall with the associated end of the bore.

Means may be provided in the second and third chambers to resist or limit any undesirable tilting of the respective valve member.

Figure 2:
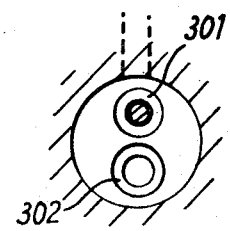
Figure 3:
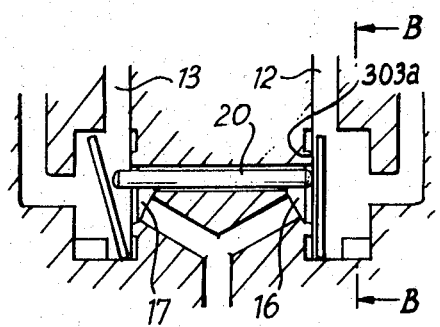
Figure 4:
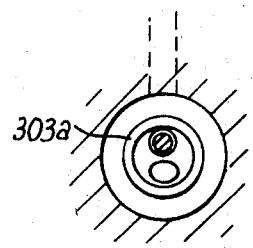
Figure 5:
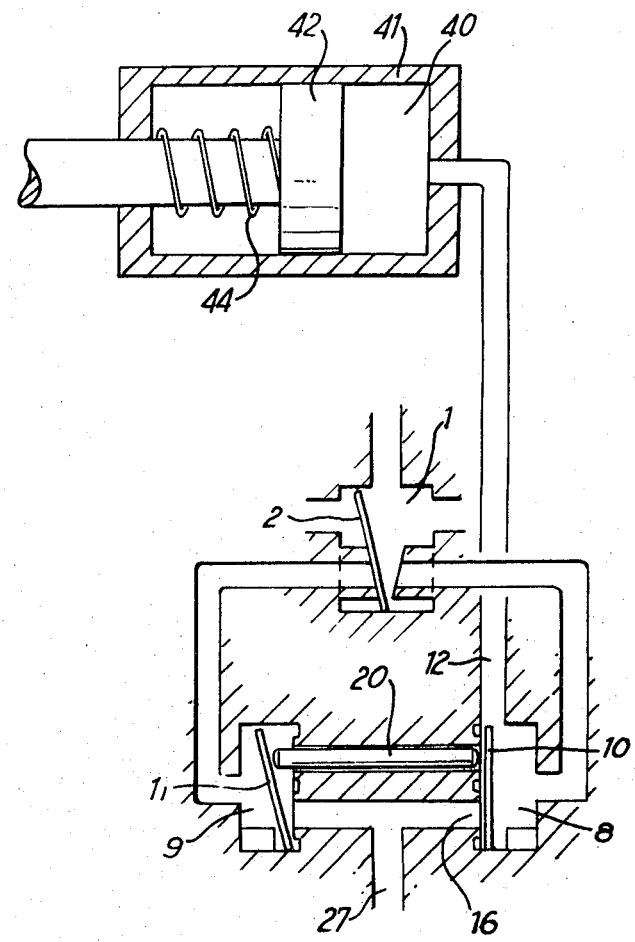
Figure 11:
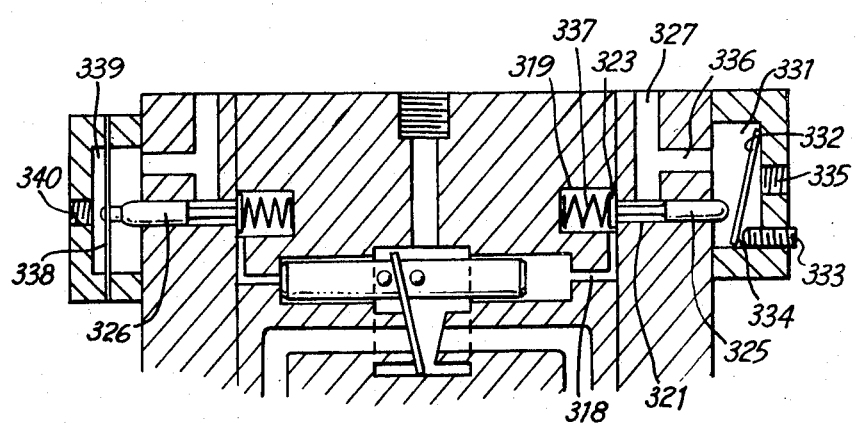
Figures 12, 13:
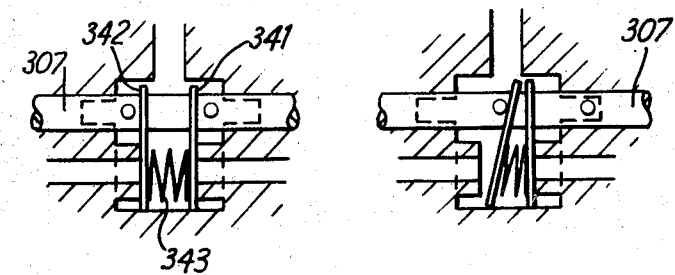
Figure 14:
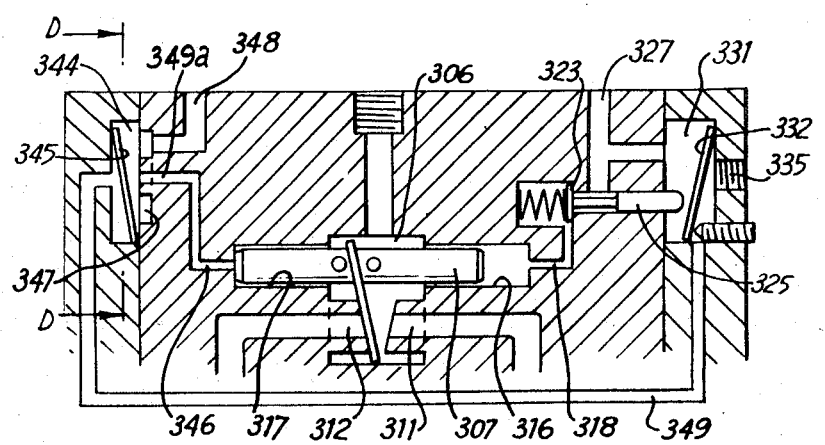
Figure 15:
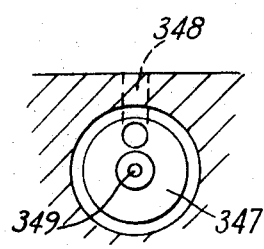
Figure 16:
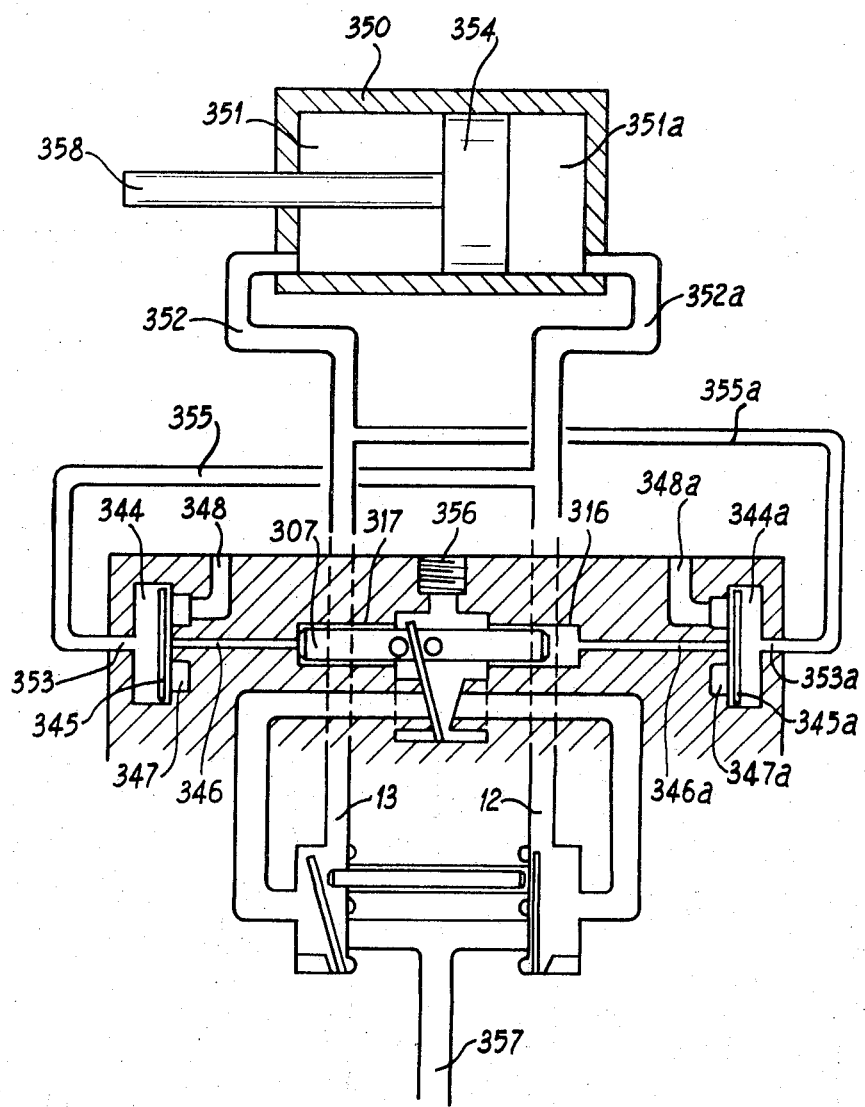

The invention may be performed in various ways and some specific embodiments, with possible modifications will now be described by way of example with reference to the accompanying drawings, in which:

FIG. 1 is a section through a valve according to the invention;
FIG. 2 is a section on the line A—A of FIG. 1;
FIG. 3 is a section through another valve;
FIG. 4 is a section on the line B—B of FIG. 3;
FIG. 5 is a section through another embodiment;
FIG. 6 is a section through a further embodiment;
FIG. 7 is a section on the line C—C of FIIG. 6;
FIG. 8 is a plan view of an operator rod;
FIG. 9 is a section through a yet further embodiment;

FIG. 10 is a modification of FIG. 9;
FIG. 11 is a further modification of FIG. 9;
FIGS. 12 and 13 show a valve chamber having two valve plates and a spring;
FIGS. 14 and 15 show another embodiment;
FIG. 16 shows a further embodiment; and FIG. 17 shows a valve assembly in association with a piston.

Figure 17:
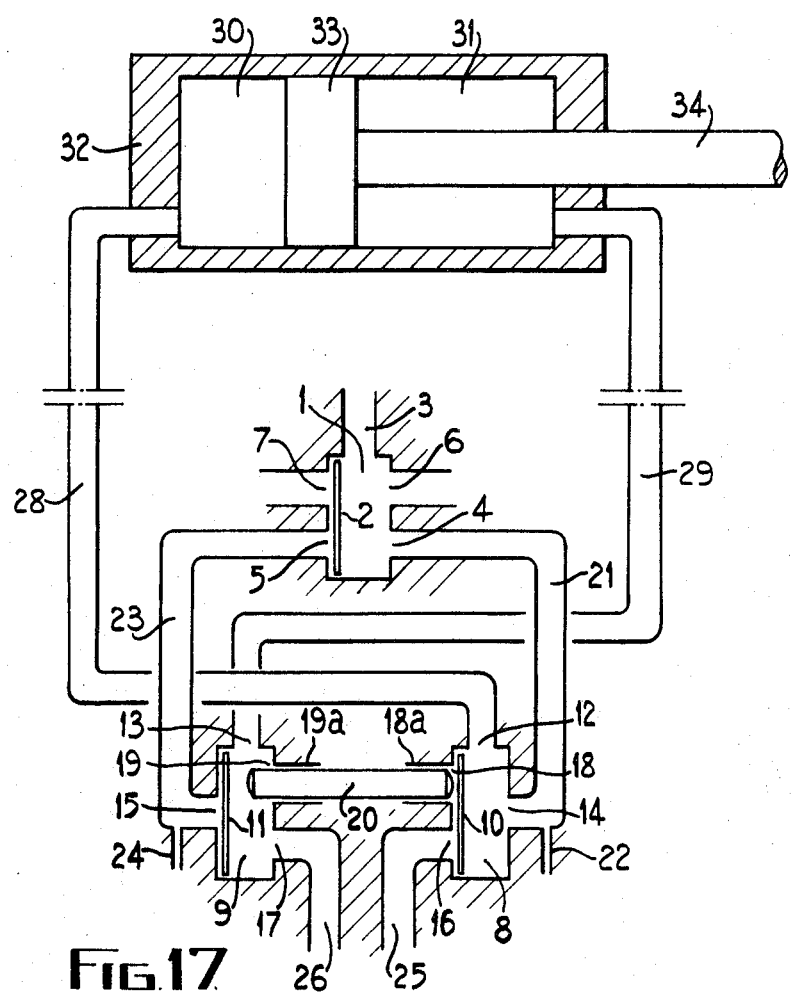

Referring to FIG. 17, which is generally similar to FIG. 1 of Patent No. 3,709,244 we see a fluid flow control valve assembly shown in conjunction with an appliance, a double acting cylinder being shown but the valve assembly could be modified for use with a single acting cylinder. It should however be understood that these particular appliances are examples only and that the valve assembly can also be applied otherwise.

In FIG. 17, the assembly comprises three chambers complete with plates, and ports, of which one is an "Inlet Chamber" 1 containing plate 2 and provided with a free inlet port 3 in a circumferential wall, each side wall containing one port 4, 5 coverable by the plate and one coverable control port 6, 7.

The other two chambers 8 and 9 which in the following are called the "Outlet Chamber," are also provided with plates 10 and 11, one free inlet port 12 and 13 in the respective circumferential walls, one port 14 and 15 on one sidewall of each cavity and one port 16 and 17 as well as one coverable control port 18 and 19 on the opposite sidewall of each cavity. The two chambers 8 and 9 are fixed in their relative position to each other in such a way that the control ports 18 and 19 are opposite each other and a pin 20, having access to the two chambers through the ports 18 and 19, can slide in sleeves 18a and 19a adjacent to the ports 18 and 19. The length of the pin is such that whilst one end thereof is in line with the sidewall of one chamber the other end thereof protrudes into the other chamber, and the arrangement being such that when one pin and touches the opposite sidewall, the pin is still slidingly guided in the sleeves.

The port 14 of outlet chamber 8 is connected with port 4 of the inlet chamber by means of a passage 21, whereas the corresponding port 15 of the outlet chamber 9 is connected to the port 5 of the inlet chamber by a passage 23. Passages 25 and 26 are connected to the ports 16 and 17 at the control port sides of the outlet chambers. They serve to dispose of the fluid from the device.

The free ports 12 and 13 of the outlet chambers 8, 9 are, shown as example only, connected by passages 28 and 29 to the working chambers 30, 31 of a double acting cylinder 32 with a piston 33 and piston rod 34.

The flow of fluid is switched from one outlet port 12 or 13 to the other outlet port by a force acting through the control ports 6 or 7 of the inlet chamber, through which the foil in that chamber is bodily moved from the side which it is resting on. After the plate has been forcibly moved by about half its traverse, the pressure difference developing on opposite sides of the plate creates a force strong enough to rapidly complete the movement of the foil to the other sidewall of the chamber. The switching force can be transmitted to the foil by either mechanical or fluidic means.

The operation of the assembly is as follows:

Assuming that the plate 2 of the inlet chamber 1 is in its rest position on one side as shown in the diagram (FIG. 17) fluid under pressure supplied through the inlet port 3 flows then through port 4, passage 21 and port 14 into output chamber 8. The pressure of the fluid moves the plate 10 in that chamber over to the opposite sidewall, whereafter the disposal port 16 is sealed and pin 20 forcibly moved towards the opposite chamber 9. A passage is now open for the fluid to flow via outlet port 12 and passage 28 into the working chamber 30 of cylinder 32, causing the piston 33 to move in the outward direction against a force which may be applied to the piston rod 34. Whilst this is taking place the volume of the working chamber 31 on the other side of the piston decreases and the fluid thus displaced flows through passage 29 into the outlet chamber 9. The plate 11 of this chamber has been lifted off the sidewall of the disposal port 17 and the control port 19 by the previously described movement of the pin 20, thus opening the chamber to passage 26 via port 17. The pressure difference now developing between opposite sides of the plate forces said plate to move rapidly against the opposite sidewall, whereby the chamber is closed to the passage 23 and the fluid leaves chamber 9 through the port 17 for disposal into passage 26. In order to ensure that this plate 11 covers port 15 a bleed orifice 24 is provided, through which any fluid leaking through port 5 of the inlet chamber 1 and port 15 of the outlet chamber 9 can drain away, thus preventing any pressure build-up.

When the piston 33 has reached its end position in the outward direction, plate 2 in the inlet chamber is switched over to its other rest position at the other side by a force acting through the control port 7 thereby opening port 5 and closing port 4. This force may be effected manually or else automatically by a striker fastened to a component which is connected to the piston rod.

The flow of the fluid supplied through port 3 is now directed through port 5, passage 23 and port 15 into the outlet chamber 11, forcing the plate to move against the sidewall of port 13 thereby closing disposal port 17 and traversing pin 20 towards the opposite outlet chamber 8, which pushes plate 10 from its seat and opens the disposal port 16. Fluid from chamber 9 now flows through passage 29 into the working chamber 31 of the cylinder 32, moving the piston 33 to the inside, and the fluid displaced from chamber 30 at the other side of the piston flows through passage 28, chamber 8 and port 16 into the passage 25 for disposal. Leakage of fluid through the ports 4 and 14 can drain off through the bleed orifice 22. Reversal of the piston movement is now a repeat of that explained in the foregoing.

Thus switching of the foils or plates 10 and 11 in the outlet chambers 8 and 9, from the FIG. 17 position after the foil 2 in the inlet chamber 1 has been switched over from one side to the other by forces acting through the control ports 6 or 7, takes place when the fluid force at the back of the foil 11 is equal to or greater than the holding force at the back of the foil 10. As the force of the fluid equals this product of area and pressure, and as the foils 10, 11 are of equal size and thus of equal areas, and as furthermore the pressure of the fluid flowing from chamber 1 into chamber 9 through the gap between the foil and circumferential wall of the chamber out to exhaust through port 17 effects less pressure at the back of foil 11 than the fluid acting on the back of foil 10, orifice 22 has been arranged through which the pressure of the enclosed medium is reduced until the holding force on foil 10 becomes equal to or smaller than the push force or foil 11. The same applies when the valve is to be switched in reverse, when pressure reduction takes place through orifice 24.

FIGS. 1 and 2 of the accompanying drawings show an embodiment of the invention and parts similar to FIG. 17 are given the same reference numerals. In this arrangement, the areas at the exhaust sides of the chambers 8 and 9, against which the foils 10 and 11 are held by the pressure of the enclosed fluid, have been reduced to narrow lands 301 around the ports 18, 19 and narrow lands 302 around the exhaust ports 16, 17, whereby the ratio of the sum of the areas enclosed by the outside diameters of the lands 301, 302 to the foil area is smaller than the ratio of the pressure at the back of the pushing foil (say 11) to the pressure in the chamber containing the foil (10) to be removed from the respective exhaust wall by an amount such that the force at the back of the pushing foil is greater than the holding force at the opposite foil and switching follows immediately after the foil 2 in the inlet chamber has been switched over. Fluid can flow passed the plate into the recess 301a defining the lands to equalize the pressure on opposite sides of part of the plates The arrangement enables the orifices 22 and 24 to be omitted and thus no fluid goes to waste, and increases the speed of switching of the valve members 10 and 11.

In the arrangement of FIG. 17 the ports 12, 13 are situated in the middle of the circumferential walls of the outlet chambers 8 and 9. In the present arrangements of FIGS. 1 and 3 these ports 12, 13 are near the exhaust port walls of the outlet chambers 8 and 9; and also there are obstacles 303, 304 inside the chambers opposite the ports 12, 13 and adjacent the walls opposite the exhaust port walls for the purpose of preventing, in association with plunger 20, the respective valve member from swivelling around the tip of plunger 20 to open a free flow connection from the feeder passages 21, 23 to the ports 12, 13 prior to the removal of the opposite foil from against a chamber wall. The former measure increases the available pressure at the back of the pushing foil. Thus whereas in the arrangement of FIG. 17 the foil is moved from a position against the left hand wall opposite port 17, in the present case the foil is initially inclined reducing the flow required through passage 23 to effect switching of the valve members. Also, the length of plunger 20, and the presence of obstacle 304, are such that when the foil has moved the plunger sufficiently to move the other foil away from the chamber wall the foil has not established communication between passages 23 and the appliance (passage 13) except through any narrow gap between the foil and the circumferential wall of the chamber. Speed of switching of the blades is thus increased.

In the arrangement of FIG. 17 exhaust ports 16, 17 and ports 18, 19 in the walls of the outlet chambers are situated next to each other. In contrast in the embodiment shown in accompanying FIGS. 3 and 4, in which the pin 20 is situated within the exhaust ports 16, 17, a land 303a around the port is the only area in contact with the foil for the same reasons as described in relation to FIGS. 1 and 2.

One arrangement described in the above identified application is for the control of a one-sided spring-returned cylinder, or to a locking cylinder which exerts a force on its piston in one limit position of the valve, but not in the other. A further embodiment of the present invention is somewhat similar and is shown in accompanying FIG. 5, which shows a valve arrangement having one inlet chamber 1 and two outlet chambers 8, 9 but only one outlet port 12, connected to the appliance 41, is provided at one outlet chamber, whilst the other outlet chamber has no outlet port. In the foil position shown in FIG. 5, fluid entering the valve through the inlet chamber 1 flows, through the outlet chamber 8, to the working side 40 of the cylinder 41, exerting force on the piston 42. After the foil 2 in the inlet chamber 1 has been switched over to the other side, fluid is directed to the other outlet chamber 9 and the foil 11 then pushes, via the pin 20, the foil 10 away from the exhaust port 16 of the chamber 8, through which the passage 12 is connected with the exhaust 27, and the piston is either unlocked or returned by the spring 44.

The following embodiments include modified arrangements for operating the foil 310 from one side of the inlet chamber 306 to the other by means of forces acting through the control ports. These and the devices disclosed now are applicable to valves containing one foil in the inlet chamber, and also to valves containing two foils in one chamber as described in the above identified application.

Referring to FIGS. 6, 7 and 8, a rod operator 307 is disposed in the control ports 304a and 305a of the inlet chamber 306, the ends of rod 307 being outside the pressure area of chamber 306 and thus not subjected to forces from within the valve. Seals 308, 309 prevent fluid from leaking past the rod. The rod can be moved in the holes 304a, 305a through forces acting on its ends, which may be of fluid, mechanical or electric origin. The plate 310 is free from permanent connection to any other operative part of the valve.

At a part of the rod 307 inside the chamber 306 is a mechanism for engaging or loosely gripping the foil 310 and thus, by moving the operator rod 307, to traverse the foil from one side to the other of the chamber and cover the one or the other of the outlet ports 311 or 312.

In the illustration shown (FIG. 6) the mechanism consists of four lugs 313 extending from the operator rod 307 to form two axially spaced pairs of opposed lugs on either side of the foil which is slotted at 314 to let the operator 307 move in the chamber 306. The faces defining ports 311, 312 can be parallel, or as shown inclined to each other; but if they form a V with the apex coinciding with the bottom of the chamber, the foil makes a swivel motion only, without any lateral motion.

In the embodiment shown in FIG. 9, an operator rod 307 with lugs 313 is contained within the pressure part of the valve and slides in the bores 316 and 317 which have a cross-section diameter larger than that of the operator rod so that medium can flow between rod and bore. Passages 318, 318a, for example with smaller cross-section than the operator rod but larger than the area of the gap between operator rod and holes 316, 317, lead to chambers 319, 320. Each chamber 319, 320 has a respective outlet passage 321, 322 which are normally closed by a loose foil 323 as shown on the right hand side, or alternatively by a ball 324 as shown at the left hand side of the drawing.

The outlet passages contain stepped pins 325, 326 which by pressing inwards opens the small chambers 319, 320 to the passages 321, 322 so that fluid coming from the chambers can be drained away from the valve past the thin ends of the pins through the passages 327, 328 leading to exhaust or a fluid reservoir.

When depressing the pin 325 at the right hand side, the medium in the chamber 319, passage 318 and the space between the passage 316 and the adjacent end of the operator rod 307 will be de-pressurized so that the operator 307 is moved first by the fluid pressure at its other end acting on a small area of the rod provided by chamfering 317a, radiusing or stepping and then, after a small movement has taken place, by the fluid pressure acting on the full area of the end of the rod, so that the increasing space at the pressurized end of the operator rod 307 is filled by fluid flowing through the gap between operator 307 and bore 317 whilst fluid at the other end is pushed out to drain through passage 318, chamber 319, pin hole 321 and drain hole 327. After the foil has been switched, the channel 318 is sealed by the end of the operator rod 307 so that no further fluid can flow to the drain hole 327 even if the pin 325 remains depressed.

The advantage of this arrangement is the absence of friction on all control parts in the pressure zone and the short stroke of the pins 325, 326 required to operate the valve, which stroke can again be from fluid, mechanical or electrical power sources.

Instead of a gap between operator 307 and holes 316, 317 used as fluid passages, special bores 329 and 330 (see FIG. 10) can be arranged connecting the ends of the holes 316, 317 with a cavity 329a of the valve which is permanently supplied with fluid from the main supply. The passages 329, 330 could connect directly to the inlet chamber rather than the inlet port.

Two further methods of operating the pins 325 and 326 are shown in FIG. 11, both designed for pilot operation using either the same, or a different, medium as that which flows through the valve.

On the right hand side of FIG. 11 is shown a chamber 331 with a foil 332, the chamber and the foil being of a larger area than the foil 323 in chamber 319. Pin 325 is situated between the two foils and the position of the larger foil 332 may be such that its area centre coincides with the pin centre, or is off-set with respect to the pin centre. In the latter case, as shown, a pin or screw 333 is arranged at the chamber wall in such a position that the pin or screw provides a fulcrum point 334 for the foil, when pressed towards the pin 325 by a signal pressure entering the chamber 331 through signal port 335, and thus enlarges the push force of the foil on to the control pin 325. Fluid flowing past the foil between the small gap of foil and chamber is led away through hole 336 into the drain passage 327. The force at the back (i.e., right hand side) of the foil 332 is thus magnified in two ways; firstly through the mechanical leverage provided by the foil, control pin and fulcrum point, and secondly by the area ratio between the large signal foil 332 and the small diameter foil 323 so that the inside force pressing the foil 323 against the mouth of the pin hole 321 can be overcome by a relatively small signal pressure.

After foil 323 has been slightly opened, the fluid behind this foil is depressurised because as soon as the foil 323 has been lifted a little, pressure in the space at the end of the operator rod 307 (FIG. 11), passage 318 and chamber 319 becomes almost zero because of being open to drain or atmosphere, so that further movement of pin 325 requires only the small force developed by the remaining pressure in the chamber 306 and the spring. Therefore, the signal foil 332 can now be allowed to act as a lever with negative advantage, i.e., foil top becomes fulcrum point, because the previously large amplification of the signal pressure is no longer necessary. Thus when moving further the foil 332 will touch the chamber wall, first with a point opposite the fulcrum 334. At this point the mechanical advantage effective up to now becomes a disadvantage, but as pressure behind the foil 323 is released, the foil 332 is now pressed against the chamber wall, thereby closing the hole 336. No further signal fluid can now escape to drain, even if the signal is maintained.

After the signal pressure has been released, both foils 323 and 332 together with pin 325 are returned to their rest position by either a spring 337 or by fluid pressure through the passage 318 which is effective after the operator 307 has been switched to the other side again.

On the left hand side of FIG. 11 is shown the operation of pin 326 by a diaphragm 338 which is deflected towards the pin by signal pressure entering the closed chamber 339 through the signal port 340. Pins, 325, 326 can both be operated by either the loose foil 332 or the diaphragm 338 arrangement or one can be operated by the loose foil and the other by the diaphragm.

The control methods shown in FIGS. 6 to 11 can also be applied to switch valves containing two foils 341, 342 in one chamber according as shown in FIGS. 12 and 13. A weak spring 343 is arranged to keep the foils against the ports when neither pressure nor flow is present in the chamber. FIG. 13 shows one side open, The operator 307 returns automatically into mid-position under the action of the spring after the signal has been released.

The control embodiment shown i FIGS. 14 and 15 is for a pilot-controlled self-returning valve, i.e. the operator 307 which moves from the left to the right hand side when a pilot signal is present at port 335 (FIG. 14), but returns automatically to the former side when the signal is taken away.

The arrangement contains on one side a signal chamber 331 similar to that described above, and on the other side a chamber 344 with a foil 345 arranged to either open or cover the mouth of passage 346 communicating with that end of the operator bore 317 which is opposite the other signal chamber, at the same time opening or closing an annular groove 347 around the mouth of the passage 346, the groove being connected to a drain 348. Signal chamber 331 can alternatively be of the diaphragm type as shown in FIG. 11, left hand side.

Both chambers 331 and 344 communicate by a passage 349 with spaces behind the foils so that signal pressure introduced at port 335 is effective at the rear (outer side) of both foils 332 and 345, causing the foil 332 to depress the pin 325 and foil 345 to close simultaneously both mouth of passage 346 and annular groove 347.

The normal position, i.e., when no signal is present at the port 335, is as shown in FIG. 14. As passage 346 is open to drain through the hole 348, but passage 318 is closed by the foil 323, pressure in passage 346 is less than in passage 318, and the foil will be kept at that side of the chamber having port 312 by the operator 307.

When a signal is supplied through port 335, both foils 332 and 345 go forward, foil 323 opening the passage 318 to drain 327 and foil 345 closing passage 346 and the annular groove 347. As now the pressures at the ends of the operator 307 are reversed, the operator 307 moves to the other side, thus opening port 312 and closing the other port 311 of the inlet chamber 306.

As both drain passages 348 and 327 are now covered by their respective foils, no signal fluid goes to waste when the signal pressure is maintained.

On termination of the signal at port 335, the foil 323 closes passage 318, whilst pressure in the passage 346 releases itself through the mouth 349a into the drain passage 348 by moving the foil 345, now without back pressure, away from the port side of the chamber 344 after which the operator 307 and foil 310 return to their normal position, under the action of the pressure developing in passage 318.

The embodiment of FIG. 16 is a modification of that shown in FIG. 14 obtained by providing both sides of the valve with chambers 344, foils 345 and annular grooves 347 as shown at the left hand side of FIG. 14. The corresponding elements on the right hand side FIG. 16 have been numbered 344a, 345a and 347a. FIG. 16 shows the complete valve applied, by example only, to a double-sided cylinder 350 with the two working sides 351 and 351a, which are connected to the outlet ports 12, 13 of the valve by means of the passages 352 and 352a.

In the normal state a permanent force or pressure at the back of the foils 345 and 345a keeps the mouths of the outlet passages 346, 346a covered so that fluid contained in this passage remains pressurized. The force acting on the foils may be from mechanical, solenoid or, as shown, fluid sources. Switching the valve follows when the force at the back of the foil is released in that chamber 344 or 344a which is next to the open part of the operator bore 316, 317.

If the control medium is a fluid, pressure changes to the chambers 344, 344a can be applied to the signal ports 353, 353a from outer sources, but can also be derived from pressure changes occurring within the valve or the appliance, utilizing for instance the fact that whilst passages 352, 352a are subjected to pressure when the piston 354 is in motion, the pressure in the exhaust passage becomes zero, when the piston is stopped by an outer force on the rod 358 or has reached its end position.

For this purpose each of the signal ports 353, 353a is connected to that passage or space of the valve-cylinder system which is driving the piston at the time when the operator bar 307 is adjacent to the outlet passage 346, 346a nearest to the chamber in question. Thus the signal port 353 is connected to passage 352a by means of signal passage 355, and signal port 353a to passage 352 by means of signal passage 355a. These connections can be made inside the valve body by bores, or by pipes outside the valve body.

In the position shown in FIG. 16, fluid supplied to the valve through port 356 is directed to the working space 351a of the cylinder 350 and drives the piston 354 to the left. Pressure of the fluid in passage 352a is transmitted to the chamber 344 and holds the foil 34 against the mouth of the outlet passage 346, at the same time covering the annular groove 347 leading to the drain 348. Because of internal valve resistance the fluid displaced from the cylinder space 351 through passage 352 and the valve to exhaust at port 357 is also pressurized although, because of load and frictional resistance on the piston 354, to a lesser degree than the fluid which drives the piston. The exhaust pressure is transmitted through passage 355a to the opposite signal port 353a, and thus into the chamber 344a and to the back of the foil 345a.

As the area of the foil is larger than that of the outlet passage 346a which it covers, the force derived from the exhaust pressure acting on the back of the foil is greater than the force trying to lift the foil off its seat and the pressure of the fluid contained in the passage 355a is maintained. Therefore, as the pressure at both sides of the operator bar 307 remains equal, the bar stays in its position and the valve cannot switch. When the movement of piston 354 is arrested by either an outer force at the rod 358 or by reaching its end position inside the cylinder, pressure in the driving line 352a is maintained, but the pressure in space 351, passage 352 and thus chamber 344a becomes zero.

As now also the force at the back of the foil 345a is thus reduced to zero, the foil is no longer able to keep the mouth of the outlet passage 346a closed. The bore 316 is thus, via drain 348a, depressurized and the operator bar 307 is moved to the right by the pressure maintained in bore 346. The valve switches now and reverses the flow of the fluid and therefore the movement of piston 354 in the cylinder.

Because the signal arrangement at both sides of the valve are identical the same switching takes place when the piston is arrested in its travel in the reverse direction.

In this way, a piston can be kept in continuous reciprocation until stopped by a force acting at one or both foils 345, 345a which prevents these from lifting off their seats. Thus the arrangement could be used for example to deliver metered quantities of fluid or to effect a repeated movement of a member.

If the valve were provided with means for optionally holding say foil 345 in the position shown, for example an external handle controlling a spring to bias the foil to the position shown, then the continuous switching of the valve could be stopped by holding foil 345 in the position shown. With a suitable control a predetermined number of valve switchings could be obtained.

In the various embodiments, the valve member plates may take different forms. For example if the working fluid is air at say a supply pressure of 100 pounds per square inch the valve plates may be of plastics and be say 0.025 or 0.030 inches thick. If the working fluid is oil, this might be at a supply pressure of say 3,000 pounds per square inch and the valve plates may be for example steel ⅛ inches thick. In each of these cases the valve plate will flex to some extent and thus tend to conform to a surface which it abuts, thus improving the seal.

We claim:

1. A fluid flow control valve assembly comprising a first fluid flow control valve having a housing, a chamber in the housing, an inlet port in communication with the chamber, at least one outlet port from the chamber, a plate-like valve member movable in the chamber in response to control means selectively to prevent or permit flow through said at least one outlet port, a second fluid flow control valve having a housing, a chamber in the housing, an exhaust port, an entry port in communication with said at least one outlet port, a further port in communication with the second valve chamber, a plate-like valve member movable in the second valve chamber alternatively to prevent communication between the further port and the outlet port while allowing communication between the further port and the entry port or to obstruct communication between the further port and the entry port and allow communication between the further port and the outlet port, said control means comprising an operating member engageable with the plate-like valve member of the first valve to move the plate positively in two opposed directions, the ends of the operating member being reciprocable in bores leading from opposed walls of said first valve chamber, passages communicating respectively with the bores and containing normally closed valve ports, means for providing communication between the first valve inlet port and said passages, and operating means operatively connected with further valve members associated with the normally closed valve ports for opening same, the operating member blocking communication between the first valve inlet port and the respective passage at the limits of movement of the first valve member.

2. A valve assembly as claimed in claim 1 in which the operating member is a rod and the means for providing communication comprises oversize bores in which the ends of the rod are located.

3. A valve assembly as claimed in claim 1, in which the means for providing communication comprises further passages in the housing.

4. A valve assembly as claimed in claim 1, in which the operating member is a rod whose ends extend exteriorly of the first housing.

5. A valve assembly as claimed in claim 1, including means biasing the valve members of the normally closed valves to the normally closed position, and drain passages communicating with said valve ports via passages containing the operating means.

6. A valve assembly as claimed in claim 1, in which the operating means for at least one further valve member comprises a rod extending exteriorly of the first valve housing.

7. A valve assembly as claimed in claim 1, in which the operating means for at least one of said further valve members comprises a further member one end of which extends into another chamber so as to be engageable by a plate movable in the chamber in response to a signal to operate the operating means and to close a passage leading from said another chamber and the respective drain.

8. A valve assembly as claimed in claim 7, including means to increase the mechanical advantage of said plate on the further member.

9. A valve assembly as claimed in claim 7, in which the operating member for at least one of said further valve members is engageable by a diaphragm in a chamber arranged for receiving a control signal.

10. A fluid flow control valve assembly comprising:

a. a first fluid flow control valve having a housing, a chamber in the housing, an inlet port in communication with the chamber, at least one outlet port from the chamber, and a first plate-like valve member movable in the chamber between two rest positions wherein it permits or prevents, respectively, flow through said at least one outlet port, b. a second fluid flow control valve having a housing, a chamber in the housing, an exhaust port from the chamber, an entry port to the chamber in communication with said at least one outlet port, a further port in communication with the second valve chamber, and a second plate-like valve member in the second valve chamber movable to alternatively prevent communication between the further port and the exhaust port while allowing communication between the further port and the entry port or to obstruct communication between the further port and the entry port and allow communication between the further port and the exhaust port, and c. control means movable in the first valve housing for positively moving the first valve member between its two rest positions, said control means being free of permanent attachment to the first valve member and engageable with the first valve member only during the movement of the valve member but being out of engagement with the first valve member when that valve member is in either of its two rest positions.

11. A valve assembly as claimed in claim 10, comprising two plate-like valve members in the first valve chamber, and spring means biassing the valve members apart, said operating member having means for alternately engaging the valve members to effect the alternate opening and closing of two outlet ports from the chamber.

12. A valve assembly as claimed in claim 10 in which the operating member has axially spaced projections between which the valve member is engaged.

13. A valve assembly as claimed in claim 10, in which the ends of the operating member are reciprocable in bores leading from opposed walls of said first valve chamber, first and second passages communicating respectively with the bores and leading to further chambers, means for providing communication between the first valve inlet and the first and second passages, another passage connecting the further chambers, normally closed valve means in the first passage controlling communication between the first passage and exhaust, operating means for the valve means extending into one of the further chambers, a plate in said one further chamber movable to open the valve means through the operating means, a plate in the other further chamber movable to close communication between the second passage and exhaust.

14. A valve assembly as claimed in claim 10, including a third fluid flow control valve having a housing, a chamber in the housing, an outlet port, another port in communication with the chamber, an entry port in communication with another outlet port of the first valve, a plate-like valve member movable in the chamber to alternatively prevent communication between the another port and the outlet port whilst allowing communication between the another port and the entry port or to obstruct communication between the another port and the entry port and allow communication between the another port and the outlet port.

15. A fluid flow control valve assembly comprising a first fluid flow control valve having a housing, a chamber in the housing, an inlet port leading into the chamber, at least one outlet port leading from the chamber, a valve member in the form of at least one plate in the chamber movable in response to control means to obstruct selectively the outlet port, a second fluid flow control valve having a housing and a chamber in the housing and a valve member in the form of a plate movable in the chamber, an entry port in a wall of said second chamber and communicating with an outlet port of the first valve, an exit port in an opposed wall of the second chamber, said valve member of the second valve being engageable with said opposed wall, and a further port communicating with the second chamber, a recess in said opposed wall to reduce the area of said opposed wall engageable by a face of the valve member, the valve member being movable to alternatively prevent communication between the further port and the exit port while allowing communication between the entry port and the further port or obstruct communication between the further port and the entry port while allowing communication between the further port and the exit port.

16. A valve assembly as claimed in claim 15, including a third fluid flow control valve having a housing, a chamber in the housing, another port communicating with the fluid chamber, an entry port in a wall of the chamber in communication with an outlet port of the first valve, an exit port in an opposed wall, a valve member in the form of a plate movable in the chamber alternatively to prevent communication between the another port and the exit port whilst allowing communication between the another port and the exit port or obstructing communication between the another port and the entry port whilst allowing communication between the another port and the exit port, a recess in said opposed wall in communication with the opposite side of the plate to reduce the area of said opposed wall engageable by a face of the valve member, a plunger movable in a bore between the second and third chambers to protrude alternatively into one of the chambers to actuate the respective valve member.

17. A valve assembly as claimed in claim 15, in which said wall area is in the form of annular lands around the ends of the bore and the exit ports.

18. A valve assembly as claimed in claim 16, in which the or each exit port has a common entrance in the opposed wall with the associated end of the bore.

19. A valve assembly as claimed in claim 15, including means in the or each further chamber to limit the movement of the respective valve member.

20. A valve assembly as claimed in claim 15, in which the further port and said another port are adjacent the respective opposed wall.

* * * * *